Patented Sept. 25, 1934

1,974,866

UNITED STATES PATENT OFFICE 1,974,866

ANTHRAQUINONE DERIVATIVES

Hermann Hauser, Basel, and Max Bommer, Riehen, near Basel, Switzerland, assignors to firm Society of Chemical Industry in Basle, Basel, Switzerland No Drawing. Application June 21, 1932, Serial No. 618,582. In Switzerland July 2, 1931

3 Claims. (Cl. 260—60)

It has been found that compounds of the probable general formula

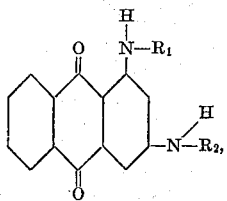

in which $R_1$ and $R_2$ represent radicles capable of being vatted, at least one of which is different from 1-anthraquinonyl, are valuable anthraquinone derivatives.

These compounds may be made according to various processes. Thus for example, 2 molecular proportions of similar or different compounds each containing one amino-group and capable of being vatted, at least one of which is different from 1-amino-anthraquinone, may be caused to react with 1 molecular proportion of 1:3-dihalogen-anthraquinone. Or 2 molecular proportions of a 1:3-dihalogen-anthraquinone may be condensed with 1 molecular proportion of a compound capable of being vatted and containing at least 2 amino-groups, and the product thus obtained transformed with 2 molecular proportions of any compound capable of being vatted, but containing at least one amino-group. Instead of the 1:3-dihalogen-anthraquinones there may be used as initial products the corresponding 1:3-diamino-anthraquinones, and on 1 molecular proportion of such a compound there may be caused to react 2 molecular proportions of similar or different compounds, each containing one reactive halogen atom and capable of being vatted, at least one of which is different from 1-halogen-anthraquinone. Or 2 molecular proportions of a 1:3-diamino-anthraquinone may be condensed with 1 molecular proportion of a compound containing at least 2 reactive halogen atoms and capable of being vatted, and the product thus obtained transformed with 2 molecular proportions of any compound capable of being vatted, but containing at least one reactive halogen atom.

The processes described above are preferably conducted in the presence of a solvent of high boiling point, such as, for example, naphthalene, nitrobenzene, trichlorobenzene in the presence of acid binding agents, such as, for instance, anhydrous sodium acetate, potassium acetate, calcined alkali-carbonates, copper oxide, magnesium oxide, and in the presence of catalysts, such as, for example, metallic copper and its compounds.

The compounds obtained in the above described manner are already dyestuffs themselves, but they may also serve as intermediate products for the manufacture of further dyestuffs.

Especially valuable dyestuffs are obtained if the products obtained according to the described processes with anthraquinone derivatives are treated with condensing agents. There are thus formed compounds of the above probable formula in which probably the carbon atom of the anthraquinone radicle $R_1$ standing in o-position to the imino-group is bridge-like linked with the carbon atom of the anthraquinone radicle standing in 2-position to the same imino-group.

As condensing agents there come into consideration for example concentrated sulfuric acid, chlorosulfonic acid and fluorsulfonic acid, aluminium chloride alone or mixed with alkali halides, or in the presence of organic bases, or as ammonia double compound. In many cases it is advantageous to apply an after-treatment of the dyestuffs obtained with oxidizing agents, for example hypochlorite.

As 1:3-dihalogen anthraquinones which may be used in the present process, there come into consideration for example the 1:3-dichloro-anthraquinone, the 1:3-dibromo-anthraquinone, the 1-chloro-3-bromo-anthraquinone, the 1-bromo-3-chloro-anthraquinone. Further also the 1:3-diamino-anthraquinone may be used in the present process.

Compounds capable of being vatted containing one each or at least two amino-groups and which may be caused to react with the 1:3-dihalogen-anthraquinones are for example the following quinones of the anthracene series: 1- and 2-amino-anthraquinones, 1:4-, 1:5-, 1:8-diamino-anthraquinones, mono-benzoyldiamino-anthraquinones, mono-acetyldiamino-anthraquinones, mono-(p-methoxy-)benzoyldiamino-anthraquinones, amino-nitro-anthraquinones, amino-dibenzanthrones, amino-pyranthrones, aminoanthanthrones, amino - anthrimides, amino-anthrimide - carbazoles, amino - anthraquinone-acridones, mono - benzoyldiamino - anthrimide-carbazoles, and the nitro derivatives of these compounds.

Compounds capable of being vatted containing one reactive halogen atom each, or at least two reactive halogen atoms, and which may be caused to react with the 1:3-diamino-anthraquinones, are for example the following quinone of the anthracene series: 1- and 2-halogen-anthraquinones, 1:4-, 1:5-, and 1:8-dihalogen-anthraquinones, halogen - benzoylamino - anthraquinones, halogen-acetylamino-anthraquinones, as well as halogen-pyranthrones, halogen-dibenzanthrones, halogen-dibenzpyrene-quinones, halogen-anthrimide-carbazoles, and the nitro derivatives of these compounds.

In dyeing, the new anthraquinone derivatives which may be produced according to the present process yield valuable shades of very good fastness properties. They may also be used in dyeing in the form of their leuco compounds, such as for instance in the form of their leuco esters.

The following examples illustrate the invention:—

Example 1

7.2 parts by weight of 1:3-dibromo-anthraquinone, 14 parts of 1:5-monobenzoyl-diamino-anthraquinone, 8 parts of anhydrous sodium acetate and 150 parts of nitrobenzene are heated to boiling for 6 hours, during which the acetic acid which is formed distils. The whole is filtered whilst still hot, the solid matter is washed with nitrobenzene and alcohol, and then extracted with boiling water, filtered and dried. There are obtained 17.7 parts of a red-brown crystalline powder of the probable formula

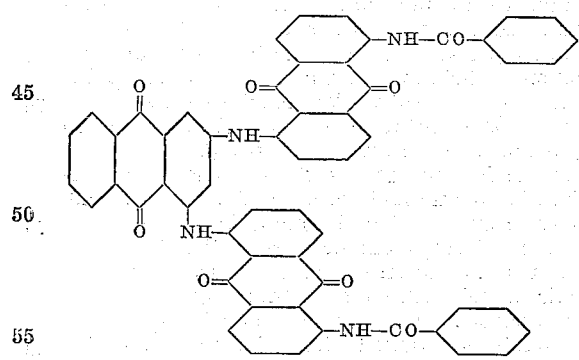

which, after precipitation from sulfuric acid of 96 per cent strength at 0° C., yields on cotton powerful red-brown dyeings of very good fastness properties.

If in this example there is used instead of 1:5-monobenzoyl-diamino - anthraquinone the isomeric 1:4-monobenzoyl-diamino-anthraquinone there is obtained a product which dyes cotton powerful currant shades.

Example 2

18.3 parts of 1:3-dibromanthraquinone, 17.1 parts of 1:5 - monobenzoyl - diaminoanthra-quinone, 10 parts of anhydrous sodium acetate, 1 part of copper acetate and 180 parts of nitrobenzene are heated to boiling for 3 hours in a reflux apparatus. The new compound which has separated is isolated by filtering the mixture whilst still hot, washed with nitrobenzene and alcohol, then boiled with water, filtered and dried. It is thus obtained in the form of small fine red needles which dissolve in sulfuric acid of 97 per cent strength to an olive brown solution. The new compound still contains a reactive halogen atom which can be replaced by another residue in the following manner:—

| | Parts |
|---|---|
| The compound | 8 |
| α-aminoanthraquinone | 3 |
| Anhydrous sodium acetate | 3 |
| Copper acetate | 1 |
| Nitrobenzene | 100 | are heated to boiling for 18 hours in a reflux apparatus and the reaction product of the probable formula

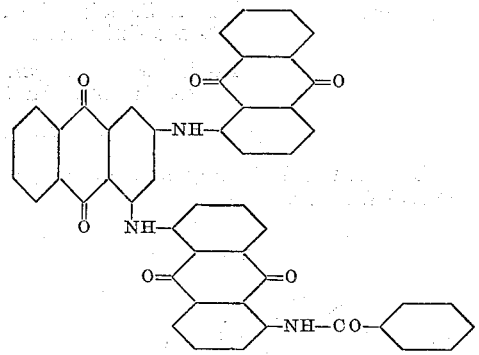

is isolated by filtering whilst still hot. It is a red crystalline powder which dissolves in sulfuric acid of 97 per cent strength to a green to olive-green solution. After the new dyestuff has been reprecipitated from its solution in concentrated sulfuric acid, it dyes cotton powerful reddish-brown shades of very good fastness to washing and to chlorine. By stirring this compound for a short while with chlorosulfonic acid at 50–55° C., diluting the chlorosulfonic acid with sulfuric acid of 80 per cent strength and pouring the whole onto ice there is obtained a new dyestuff of the probable formula

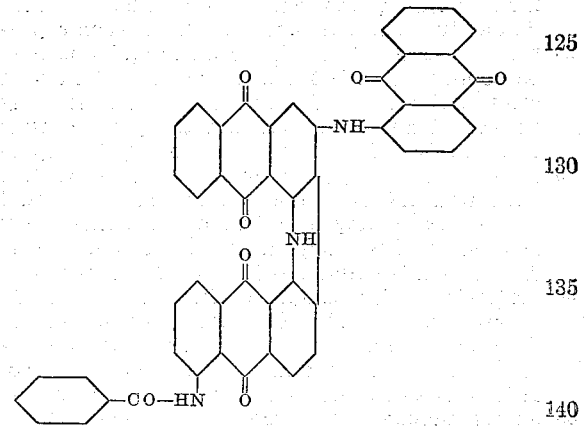

which after treatment in known manner with a solution of sodium hypochlorite dyes cotton in a heated vat powerful brown shades having a good resistance towards washing, kier boiling and to chlorine.

Example 3

3.6 parts of 1:3-dibromanthraquinone, 9.4 parts of amino-dibenzanthrone (obtainable by nitrating dibenzanthrone in nitrobenzene, recrystallizing the product from concentrated sulfuric acid, vatting it with simultaneous reduction and recovering the product from the vat), 5 parts of anhydrous sodium acetate, 1 part of copper acetate and 170 parts of nitrobenzene are heated to boiling for 22 hours in a reflux apparatus. The sparingly soluble reaction product of the probable formula

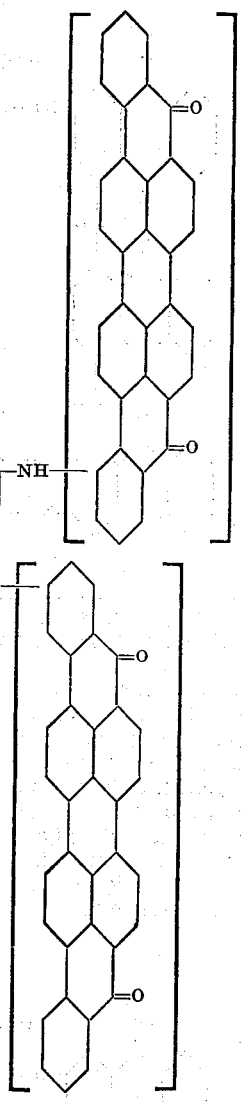

is isolated by filtering the reaction mixture at 70° C. and is washed with nitrobenzene, then with alcohol and finally with boiling water. The new dyestuff dissolves in sulfuric acid of 97 per cent strength to a red-violet solution, from which blue-green flakes are precipitated by pouring into water. It dyes cotton dark green shades which are distinguished above all by their good fastness to chlorine.

*Example 4*

18.3 parts of 1:3-dibromanthraquinone, 17.1 parts of 1:4-monobenzoyl-diaminoanthraquinone, 10 parts of anhydrous sodium acetate, 1 part of copper acetate and 180 parts of nitrobenzene are heated to boiling for 3 hours in a reflux apparatus; the nitrobenzene is then expelled by distillation with steam and the product is isolated by filtering the residue of the distillation. After the new dyestuff has been reprecipitated from its solution in concentrated sulfuric acid it dyes cotton weak currant shades. By further reaction with 1:5-monobenzoyl-diaminoanthraquinone the bromine atom in β-position is also exchanged and there is obtained a dyestuff of the probable formula

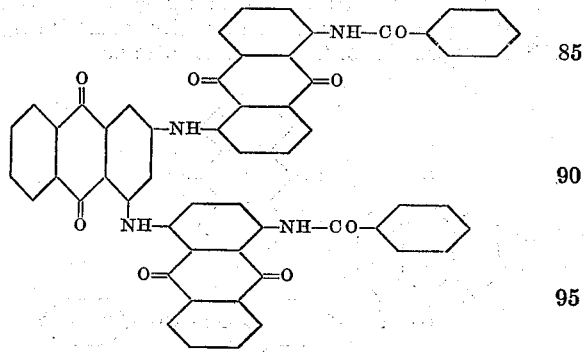

which dyes cotton in a cold or heated vat violet brown shades of good fastness to washing and to kier-oiling and of very good fastness to chlorine.

*Example 5*

4.8 parts of 1:3-diamino-anthraquinone, 17 parts of 1-benzoyl-amino-3-bromanthraquinone, 14 parts of anhydrous potassium acetate, 1 part of copper acetate and 200 parts of nitrobenzene are heated to boiling for 36 hours in a reflux apparatus; the nitrobenzene is then expelled by distillation with steam and the new product of the probable formula

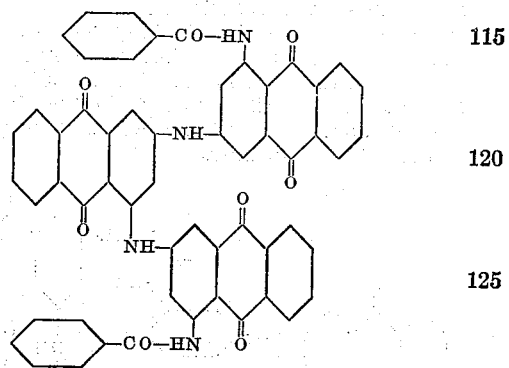

isolated by filtering the distillation residue. It is purified by boiling with 5 times its weight of nitrobenzene, stirring until cold and filtering cold. The new dyestuff is thus obtained in the form of small needles. It dissolves at ordinary temperature in sulfuric acid of 92 per cent strength to a solution which is at first dull violet but rapidly becomes blue. It dyes cotton in a vat very fast reddish-brown shades.

*Example 6*

18.3 parts of 1:3-dibromanthraquinone, 17.1 parts of 1:4-monobenzoyl-diaminoanthraquinone, 10 parts of anhydrous sodium acetate, 1 part of copper acetate and 180 parts of nitrobenzene are heated to boiling for 3 hours, whereupon the nitrobenzene is expelled by distillation with steam and the reaction product, still containing one halogen atom in the molecule, is isolated by filtration. It is soluble in sulfuric acid of 97 per cent strength to an olive-green solution.

7.7 parts of the product, 3 parts of 1-aminoanthraquinone, 3 parts of anhydrous sodium acetate, 0.5 part of copper acetate and 100 parts of nitrobenzene are heated to boiling for 18 hours in a reflux apparatus. The reaction mixture is allowed to cool to 50° C. whilst stirring and filtered at this temperature; the solid matter constituting the new product of the probable formula

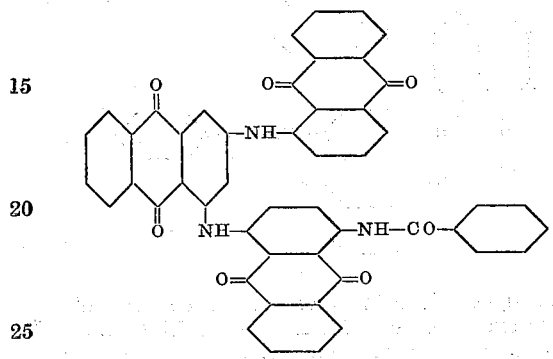

is washed with a small quantity of nitrobenzene and boiled with water. The product dissolves in sulfuric acid monohydrate to a grass-green solution. It dyes cotton in a vat fast wine-red shades.

*Example 7*

18.3 parts of 1:3-dibromanthraquinone, 11.2 parts of 1-aminoanthraquinone, 12 parts of anhydrous sodium acetate, 1 part of copper acetate and 400 parts of nitrobenzene are heated to boiling for 5 hours. The reaction mixture is then cooled somewhat, 6 parts of 1:5-diaminoanthraquinone are added and the whole is boiled in a reflux apparatus for a further 18 hours. The solid matter is separated by filtering at 50° C. and washed with a small quantity of nitrobenzene. The product of the probable formula

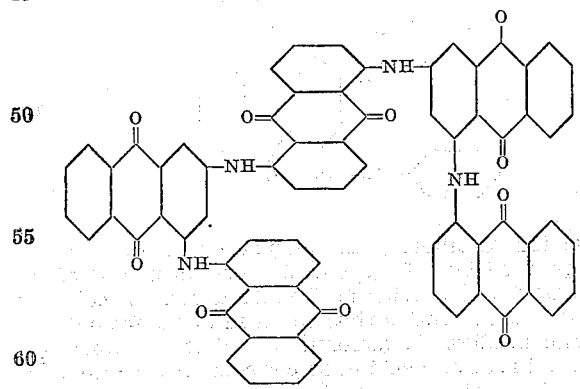

dissolves in sulfuric acid monohydrate to a green solution. It dyes cotton in a vat fast red shades.

*Example 8*

74 parts of 1:3-dibromanthraquinone, 23.8 parts of 1:4-diaminoanthraquinone, 25 parts of anhydrous sodium acetate, 1 part of copper acetate, and 800 parts of nitrobenzene are heated to boiling for 10 hours. The reaction product is separated by filtering the reaction mixture when cold, and washed with nitrobenzene and alcohol, and then extracted with boiling water and dried.

30 parts of the compound thus obtained, which still contains about 16 per cent of bromine, are heated to boiling for 22 hours with 20 parts of 1-aminoanthraquinone, 5 parts of anhydrous sodium acetate, 10 parts of sodium carbonate, 1 part of copper chloride and 600 parts of nitrobenzene. The reaction product of the probable formula

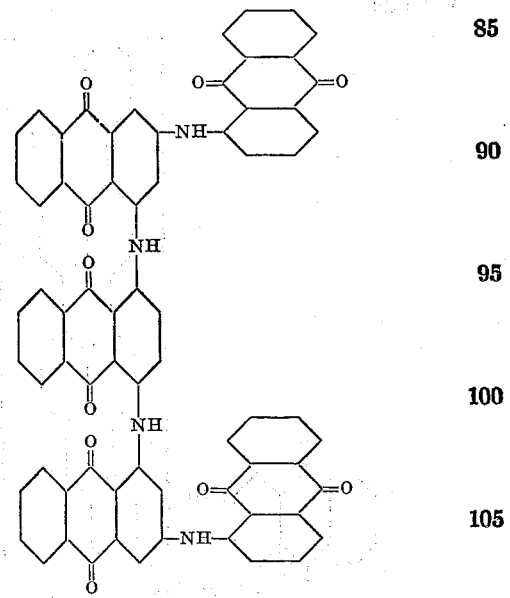

is filtered off at about 100° C. It is soluble in sulfuric acid monohydrate to a pure green solution, from which violet-brown flakes are precipitated by pouring into water.

10 parts of this compound are then entered at about 100° C. into a fusion mass which is obtained by adding 20 parts of anhydrous aluminium chloride to 40 parts of pyridine in such a way that the temperature does not essentially exceed 100° C. The temperature is then raised until the pyridine begins to boil slightly. After 1 hour the fusion mass is poured into an alkaline sodium hydrosulfite solution whereby the new dyestuff of the probable formula

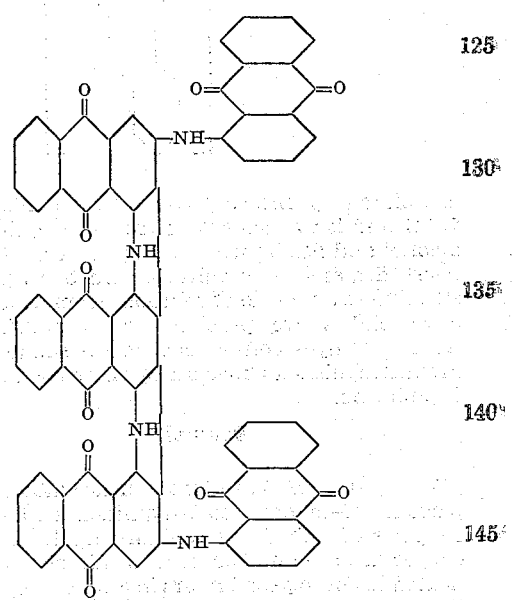

dissolves to a solution which is yellow-brown. The solution is then filtered so as to remove small unvatted constituents and the dyestuff is separated from the filtrate by vigorous stirring in the air at ordinary temperature, and isolated by filtration. It is obtained as a dark powder which dissolves in concentrated sulfuric acid to a reddish brown-black solution. It dyes cotton from the vat blackish-olive shades of very good fastness properties.

*Example 9*

74 parts of 1:3-dibromanthraquinone, 23.8 parts of 1:5-diamino-anthraquinone, 25 parts of anhydrous sodium acetate, 1 part of copper acetate and 800 parts of nitrobenzene are heated to boiling for 10 hours. The reaction product which separates in crystalline form is filtered when cold, washed with nitrobenzene and freed in usual manner from inorganic constituents. It still contains about 17 per cent of bromine.

20 parts of the conversion product thus obtained are then heated to boiling for 24 hours with 20 parts of 1-amino-anthraquinone, 15 parts of sodium carbonate, 3 parts of sodium acetate, 1 part of copper chloride and 200 parts of naphthalene. The whole is then allowed to cool slightly, and 200 parts of chlorobenzene are added. The reaction product is filtered at about 100°, washed with chlorobenzene and worked up as usual. The compound thus obtained of the probable formula

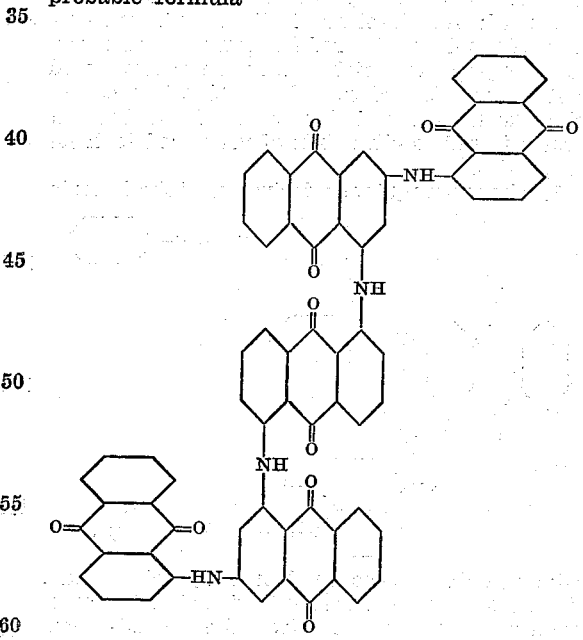

is then further treated as follows:

40 parts of aluminium chloride are added so slowly to 80 parts of pyridine that no boiling of the pyridine occurs, 20 parts of the above new compound added, and the whole heated for about 1 hour in a reflux apparatus whilst stirring. The fusion mass is then poured into an alkaline hydrosulfite solution whilst still hot, whereby the new dyestuff goes into solution. The solution is then appropriately filtered to remove portions which have not been vatted, and the filtrate is treated by vigorously stirring in the air. The dyestuff thus obtained of the probable formula

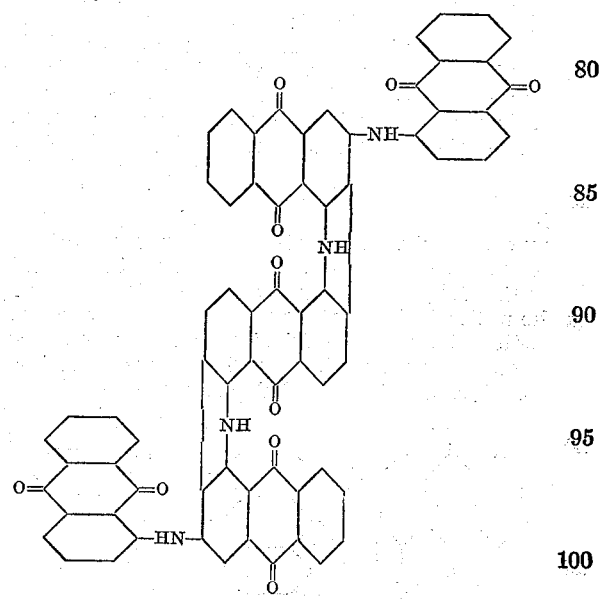

dissolves in concentrated sulfuric acid to a blue solution, from which brown flakes are precipitated by pouring into water. It dyes cotton from a warm vat strong reddish-brown shades of good fastness properties.

*Example 10*

74 parts of 1:3-dibromanthraquinone, 23.8 parts of 1:4-diaminoanthraquinone, 25 parts of anhydrous sodium acetate, 1 part of copper acetate, and 800 parts of nitrobenzene are heated to boiling for 10 hours. When cold, the reaction product is filtered, the solid matter is washed with nitrobenzene and alcohol, and then extracted with boiling water and dried.

20 parts of the compound thus obtained, which still contains about 16 percent of bromine, are now heated to boiling for 24 hours with 20 parts of 1:4-mono-benzoyldiamino-anthraquinone, 5 parts of anhydrous sodium acetate, 10 parts of sodium carbonate, 1 part of copper chloride, and 400 parts of nitrobenzene. The reaction product of the probable formula

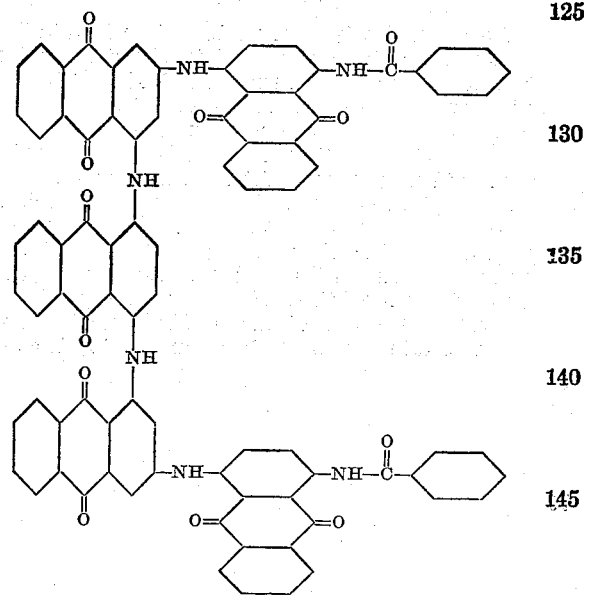

is filtered at about 80° C., washed with nitrobenzene and afterwards with alcohol, and then extracted with boiling water and a small quantity of dilute nitric acid, filtered and dried. By boiling up with nitrobenzene and hot filtration it is freed from the 1:4-monobenzoyldiamino-anthraquinone in excess. The product dissolves in sulfuric acid monohydrate to a grass-green solution.

10 parts of this compound are then entered at about 100° C. into a fusion mass which is obtained by adding 20 parts of anhydrous aluminium chloride to 40 parts of pyridine in such a way that the temperature does not essentially exceed 100° C. The temperature is then raised until the pyridine begins to boil slightly. After 1 hour the fusion mass is poured into an alkaline sodium hydrosulfite solution, whereby the new dyestuff dissolves to a yellow-brown solution. The dyestuff of the probable formula

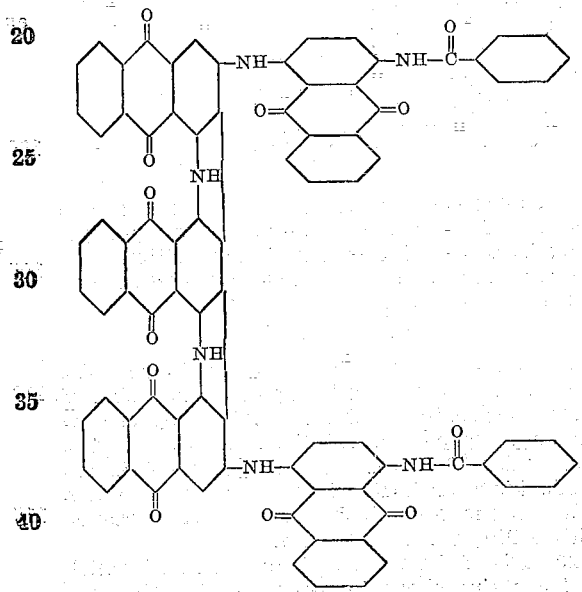

is precipitated by vigorously stirring in the air at ordinary temperature, and filtered. It dissolves in concentrated sulfuric acid to an olive-brown solution. It dyes cotton from a vat powerful olive shades of very good fastness properties.

*Example 11*

1 gram of the dyestuff made as described in the first paragraph of Example 1 is well stirred with 5 cc. of caustic soda solution of 36° Bé. and 100 cc. of water at a temperature of 25-30° C.; 2 grams of hydrosulfite concentrated powder are added and vatting is continued for half-an-hour at the aforesaid temperature. The dye-bath is prepared with 3 cc. of caustic soda solution of 36° Bé., 1 gram of hydrosulfite and sufficient water to make up the bath, including the parent vat to 2 liters; the parent vat is then added. The material is entered at 25-30° C. handled for a quarter-of-an-hour, 20 grams of sodium chloride or calcined sodium sulfate are then added, and dyeing is continued for 1 hour at 25-30° C. The material is then wound off, allowed to oxidize in the air for half-an-hour, then rinsed, soured, again rinsed, and soaped at the boil. The material is thus dyed red-brown.

What we claim is:—

1. Anthraquinone derivatives of the general formula

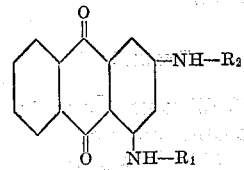

wherein $R_1$ and $R_2$ represent radicles of quinone of the anthracene series, of which at least one is different from 1-anthroquinonyl which products form brown to red to green to dark powders, which dissolve in concentrated sulfuric acid to red to violet to blue to green to black solutions, and dye cotton from the vat brown to red to green to olive tints of very good fastness properties.

2. Anthraquinone derivatives of the general formula

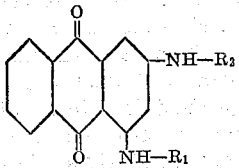

wherein $R_1$ and $R_2$ represent anthraquinone radicles of which at least one is different from 1-anthraquinonyl, which products form brown to red to dark powders which dissolve in concentrated sulfuric acid to red to violet to blue to green to black solutions, and dye cotton from the vat brown to red to olive tints of very good fastness properties.

3. The anthraquinone derivative of the formula

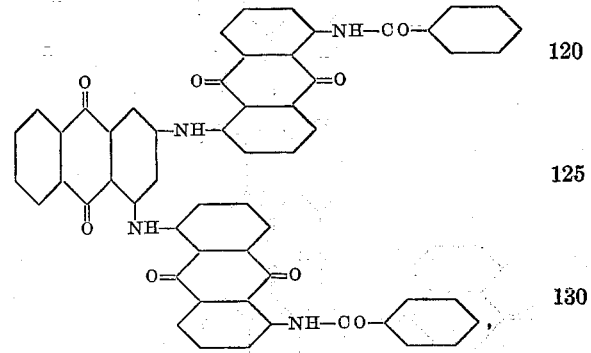

which product forms a red-brown powder, which dissolves in concentrated sulfuric acid to a brown solution, and dyes cotton from the vat red-brown tints of very good fastness properties.

HERMANN HAUSER.
MAX BOMMER.